United States Patent
Damnjanovic et al.

(10) Patent No.: US 11,375,381 B2
(45) Date of Patent: Jun. 28, 2022

(54) DETECTION OF FIXED SERVICE INCUMBENTS ON AN UNLICENSED RADIO FREQUENCY BAND

(71) Applicant: QUALCOMM Incorporated, San Diego, CA (US)

(72) Inventors: Aleksandar Damnjanovic, Del Mar, CA (US); Tevfik Yucek, San Jose, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 17/155,894

(22) Filed: Jan. 22, 2021

(65) Prior Publication Data

US 2021/0243608 A1 Aug. 5, 2021

Related U.S. Application Data

(60) Provisional application No. 62/969,341, filed on Feb. 3, 2020.

(51) Int. Cl.
*H04W 16/14* (2009.01)
*H04B 17/318* (2015.01)
(Continued)

(52) U.S. Cl.
CPC .......... *H04W 16/14* (2013.01); *H04B 17/318* (2015.01); *H04W 24/10* (2013.01); *H04W 84/12* (2013.01)

(58) Field of Classification Search
CPC ..... H04W 16/14; H04W 24/10; H04W 84/12; H04B 17/318
(Continued)

(56) References Cited

U.S. PATENT DOCUMENTS

2015/0208415 A1* 7/2015 Xu ........................... H04L 1/08
370/329
2016/0050667 A1* 2/2016 Papasakellariou .... H04L 5/0048
370/329
(Continued)

FOREIGN PATENT DOCUMENTS

WO WO-2015034944 A1 * 3/2015 ........... H04L 1/0015

OTHER PUBLICATIONS

Stefan et al, "Wireless LAN in paired radio spectrum with downlink-uplink separation" Nov. 20, 2014, IEEE WCNC'14 Track4, 6 pages (Year: 2014).*

*Primary Examiner* — Mong-Thuy T Tran
(74) *Attorney, Agent, or Firm* — Harrity & Harrity LLP/Qualcomm Incorporated

(57) ABSTRACT

Various aspects of the present disclosure generally relate to wireless communication. In some aspects, a node may receive a configuration associated with measuring an energy level of a first frequency channel of an unlicensed radio frequency band, wherein the configuration indicates a set of measurement occasions during which the energy level is to be measured on the first frequency channel; measure the energy level on the first frequency channel in a first measurement occasion, of the set of measurement occasions, according to the configuration; and operate in association with a second frequency channel of the unlicensed radio frequency band based at least in part on measuring the energy level on the first frequency channel, wherein the second frequency channel is paired with the first frequency channel for the unlicensed radio frequency band. Numerous other aspects are provided.

30 Claims, 7 Drawing Sheets

(51) Int. Cl.
*H04W 24/10* (2009.01)
*H04W 84/12* (2009.01)

(58) Field of Classification Search
USPC .......................................................... 370/329
See application file for complete search history.

(56) References Cited

U.S. PATENT DOCUMENTS

| | | | |
|---|---|---|---|
| 2016/0173361 A1* | 6/2016 | Somasundaram | H04L 43/16 370/328 |
| 2017/0150515 A1* | 5/2017 | Suzuki | H04W 16/14 |
| 2018/0007575 A1* | 1/2018 | Singhal | H04L 5/006 |
| 2018/0351704 A1* | 12/2018 | Papasakellariou | H04W 52/0251 |
| 2020/0153684 A1* | 5/2020 | Wang | H04W 56/0045 |

* cited by examiner

DETECTION OF FIXED SERVICE INCUMBENTS ON AN UNLICENSED RADIO FREQUENCY BAND

CROSS-REFERENCE TO RELATED APPLICATION

This Patent Application claims priority to Provisional Patent Application No. 62/969,341, filed on Feb. 3, 2020, entitled "DETECTION OF FIXED SERVICE INCUMBENTS ON AN UNLICENSED RADIO FREQUENCY BAND," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for detection of fixed service incumbents on an unlicensed radio frequency band.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the LTE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a node, may include receiving a configuration associated with measuring an energy level of a first frequency channel of an unlicensed radio frequency band, wherein the configuration indicates a set of measurement occasions during which the energy level is to be measured on the first frequency channel; measuring the energy level on the first frequency channel in a first measurement occasion, of the set of measurement occasions, according to the configuration; and operating in association with a second frequency channel of the unlicensed radio frequency band based at least in part on measuring the energy level on the first frequency channel, wherein the second frequency channel is paired with the first frequency channel for the unlicensed radio frequency band.

In some aspects, a method of wireless communication, performed by a control node, may include transmitting a configuration associated with measuring an energy level of a first frequency channel of an unlicensed radio frequency hand, wherein the configuration indicates a set of measurement occasions during which the energy level is to be measured on the first frequency channel; receiving a report, on at least one uplink channel of the unlicensed radio frequency band, that indicates the energy level measured by a node on the first frequency channel during a first measurement occasion of the set of measurement occasions; and operating in association with a second frequency channel of the unlicensed radio frequency band based at least in part on the report, wherein the second frequency channel is paired with the first frequency channel for the unlicensed radio frequency band.

In some aspects, a node for wireless communication may include a memory and one or more processors operatively coupled to the memory. The memory and the one or more processors may be configured to receive a configuration associated with measuring an energy level of a first frequency channel of an unlicensed radio frequency band, wherein the configuration indicates a set of measurement occasions during which the energy level is to be measured on the first frequency channel measure the energy level on the first frequency channel in a first measurement occasion, of the set of measurement occasions, according to the configuration; and operate in association with a second frequency channel of the unlicensed radio frequency band based at least in part on measuring the energy level on the first frequency channel, wherein the second frequency channel is paired with the first frequency channel for the unlicensed radio frequency band.

In some aspects, a control node for wireless communication may include a memory and one or more processors operatively coupled to the memory. The memory and the one or more processors may be configured to transmit a configuration associated with measuring an energy level of a first frequency channel of an unlicensed radio frequency band, wherein the configuration indicates a set of measurement occasions during which the energy level is to be measured on the first frequency channel; receive a report, on at least one uplink channel of the unlicensed radio frequency band, that indicates the energy level measured by a node on the first frequency channel during a first measurement occasion of the set of measurement occasions; and operate in association with a second frequency channel of the unlicensed radio frequency band based at least in part on the report, wherein the second frequency channel is paired with the first frequency channel for the unlicensed radio frequency band.

In some aspects, a non-transitory computer-readable medium may store one or more instructions for wireless communication. The one or more instructions, when executed by one or more processors of a node, may cause the node to receive a configuration associated with measuring an energy level of a first frequency channel of an unlicensed radio frequency band, wherein the configuration indicates a set of measurement occasions during which the energy level is to be measured on the first frequency channel; measure the energy level on the first frequency channel in a first measurement occasion, of the set of measurement occasions, according to the configuration; and operate in association with a second frequency channel of the unlicensed radio frequency band based at least in part on measuring the energy level on the first frequency channel, wherein the second frequency channel is paired with the first frequency channel for the unlicensed radio frequency band.

In some aspects, a non-transitory computer-readable medium may store one or more instructions for wireless communication. The one or more instructions, when executed by one or more processors of a control node, may cause the control node to transmit a configuration associated with measuring an energy level of a first frequency channel of an unlicensed radio frequency band, wherein the configuration indicates a set of measurement occasions during which the energy level is to be measured on the first frequency channel; receive a report, on at least one uplink channel of the unlicensed radio frequency band, that indicates the energy level measured by a node on the first frequency channel during a first measurement occasion of the set of measurement occasions; and operate in association with a second frequency channel of the unlicensed radio frequency band based at least in part on the report, wherein the second frequency channel is paired with the first frequency channel for the unlicensed radio frequency band.

In some aspects, an apparatus for wireless communication may include means for receiving a configuration associated with measuring an energy level of a first frequency channel of an unlicensed radio frequency band, wherein the configuration indicates a set of measurement occasions during which the energy level is to be measured on the first frequency channel; means for measuring the energy level on the first frequency channel in a first measurement occasion, of the set of measurement occasions, according to the configuration; and means for operating in association with a second frequency channel of the unlicensed radio frequency band based at least in part on measuring the energy level on the first frequency channel, wherein the second frequency channel is paired with the first frequency channel for the unlicensed radio frequency band.

In some aspects, an apparatus for wireless communication may include means for transmitting a configuration associated with measuring an energy level of a first frequency channel of an unlicensed radio frequency band, wherein the configuration indicates a set of measurement occasions during which the energy level is to be measured on the first frequency channel; means for receiving a report, on at least one uplink channel of the unlicensed radio frequency band, that indicates the energy level measured by a node on the first frequency channel during a first measurement occasion of the set of measurement occasions; and means for operating in association with a second frequency channel of the unlicensed radio frequency band based at least in part on the report, wherein the second frequency channel is paired with the first frequency channel for the unlicensed radio frequency band.

Aspects generally include a method, apparatus, system, computer program product, non-transitory computer-readable medium, user equipment, base station, wireless communication device, node, control node, wireless local area network (WLAN) access point, WLAN station, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWING

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
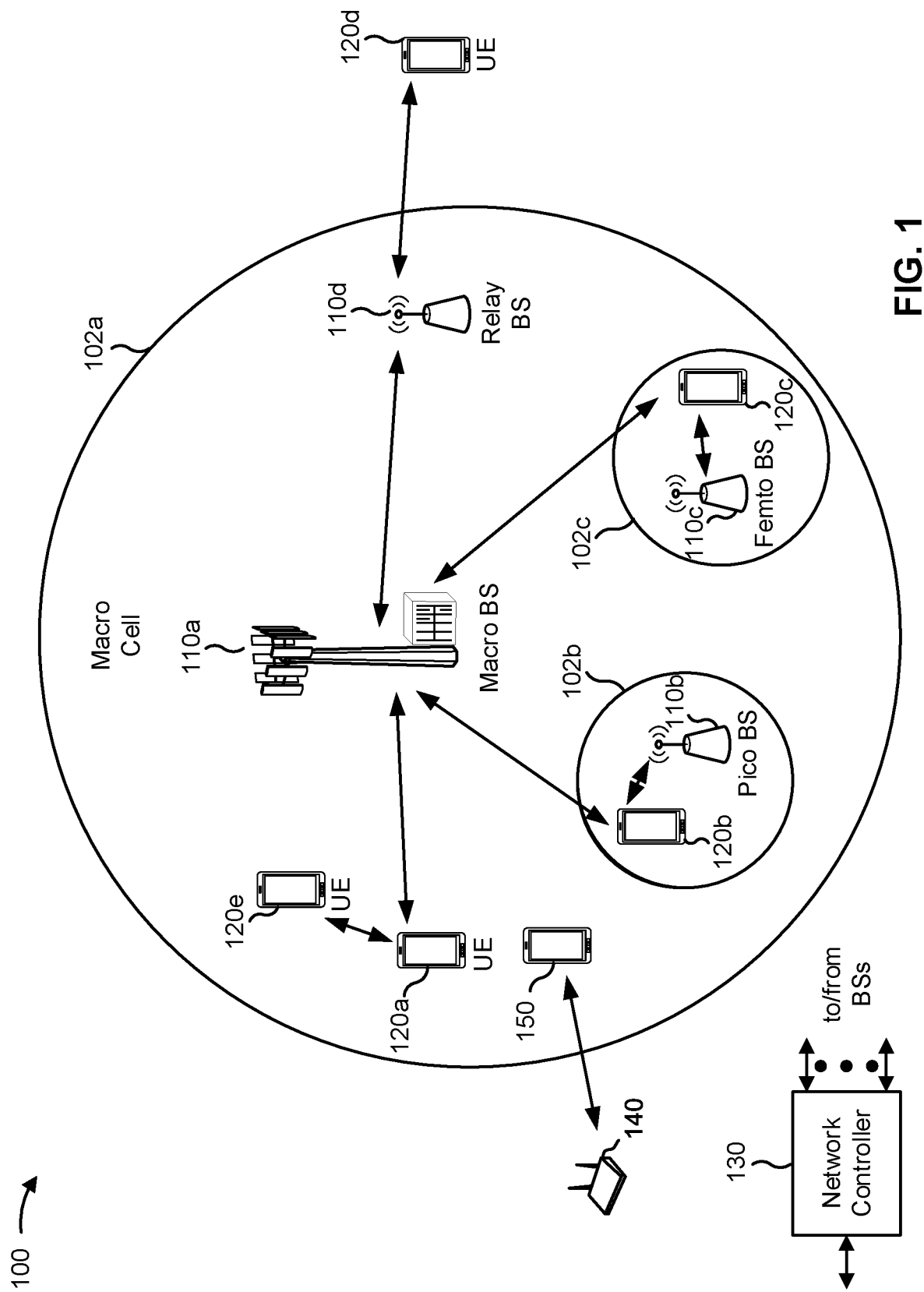
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internetof-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Additionally, or alternatively, the wireless network 100 may include one or more WLAN access points 140 and one or more WLAN stations 150. With reference to the WLAN of the wireless communication system 100, the WLAN access points 140 may wirelessly communicate with the WLAN stations 150 via one or more WLAN access point antennas, over one or more communication links. In some aspects, a WLAN access point 140 may communicate with a WLAN station 150 using one or more Wi-Fi communication standards, such as an Institute of Electrical and Electronics (IEEE) Standard 802.11 (e.g., IEEE Standard 802.11a, IEEE Standard 802.11n, or IEEE Standard 802.11ac). In some aspects, a WLAN access point 140 and a base station 110 may be the same device or may be co-located. Additionally, or alternatively, a WLAN station 150 and a UE 120 may be the same device or may be co-located.

In some aspects, a base station 110 and a UE 120 may communicate with one another using a licensed radio frequency spectrum band and/or an unlicensed radio frequency spectrum band. For example, a base station 110 and a UE 120 may communicate using an NR-Unlicensed (NR-U) RAT. In some aspects, a WLAN access point 140 and WLAN station 150 may communicate with one another using only the unlicensed radio frequency spectrum band (and not the licensed radio frequency spectrum band). The unlicensed radio frequency spectrum band may therefore be shared by the base stations 110, the UEs 120, the WLAN access points 140, and/or the WLAN stations 150. Because the unlicensed radio frequency spectrum band may be shared by apparatuses operating under different protocols (e.g., different RATs), transmitting apparatuses may contend for access to the unlicensed radio frequency spectrum band. In some aspects, "WLAN" may refer to a Wi-Fi network, an NR-U network, and/or the like.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (ERE) hand (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
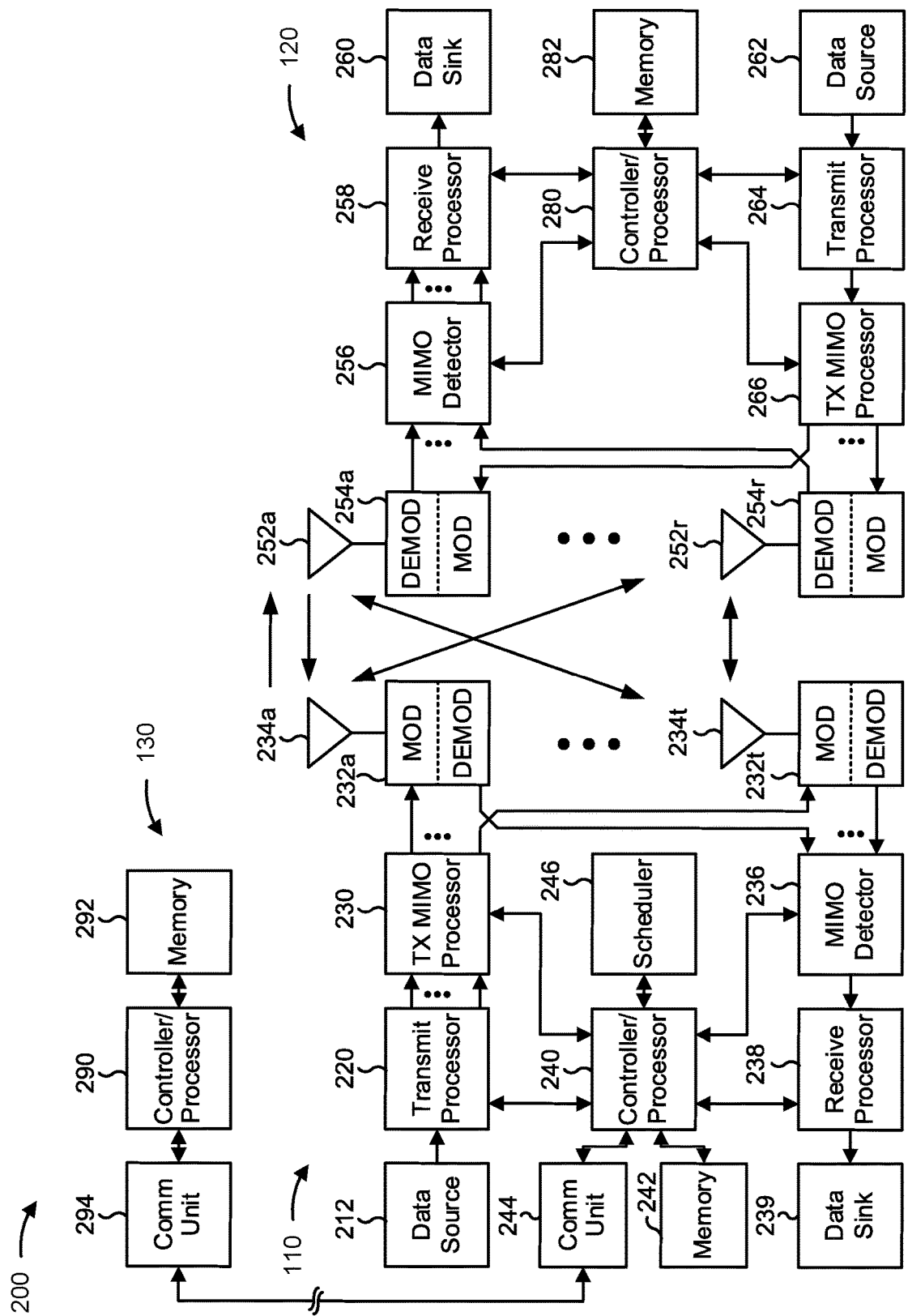
FIG. 2 is a diagram illustrating an example of a base station or a control node in communication with a UE or a node in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antennas) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-5.

Although components of FIG. 2 are described in connection with a base station 110 and a UE 120, one or more of the components of FIG. 2 may be included in a control node (e.g., a base station 110, a WLAN access point 140, and/or the like) or a node (e.g., a UE 120, a WLAN station 150, and/or the like). The control node and the node may be configured to communicate using an unlicensed radio frequency (RF) band. Controller/processor 240 of the control node, controller/processor 280 of the node, and/or any other component(s) of FIG. 2 may perform one or more techniques associated with detection of fixed service incumbents on an unlicensed radio frequency band, as described in more detail elsewhere herein. For example, controller/processor 240 of the control node, controller/processor 280 of the node, and/or any other component(s) of FIG. 2 may perform or direct operations of, for example, process 600 of FIG. 6, process 700 of FIG. 7, and/or other processes as described herein. Memories 242 and 282 may store data and program codes for the control node and the node, respectively. In some aspects, memory 242 and/or memory 282 may comprise a non-transitory computer-readable medium storing one or more instructions for wireless communication. For example, the one or more instructions, when executed by one or more processors of the control node and/or the node, may perform or direct operations of, for example, process 600 of FIG. 6, process 700 of FIG. 7, and/or other processes as described herein. A scheduler 246 may schedule UEs for data transmission on the downlink and/or uplink.

In some aspects, a node (e.g., UE 120, a WLAN station 150, and/or the like) may include means for receiving a configuration associated with measuring an energy level of a first frequency channel of an unlicensed radio frequency band, wherein the configuration indicates a set of measurement occasions during which the energy level is to be measured on the first frequency channel; means for measuring the energy level on the first frequency channel in a first measurement occasion, of the set of measurement occasions, according to the configuration; means for operating in association with a second frequency channel of the unlicensed radio frequency band based at least in part on measuring the energy level on the first frequency channel, wherein the second frequency channel is paired with the first frequency channel for the unlicensed radio frequency band; and/or the like. In some aspects, such means may include one or more components described in connection with the UE 120 of FIG. 2, such as controller/processor 280, transmit processor 264, TX MIMO processor 266, MOD 254, antenna 252, DEMOD 254, MIMO detector 256, receive processor 258, and/or the like.

In some aspects, a control node (e.g., base station 110, a WLAN access point 140, and/or the like) may include means for transmitting a configuration associated with measuring an energy level of a first frequency channel of an unlicensed radio frequency band, wherein the configuration indicates a set of measurement occasions during which the energy level is to be measured on the first frequency channel; means for receiving a report, on at least one uplink channel of the unlicensed radio frequency band, that indicates the energy level measured by a node on the first frequency channel during a first measurement occasion of the set of measurement occasions; means for operating in association with a second frequency channel of the unlicensed radio frequency band based at least in part on the report, wherein the second frequency channel is paired with the first frequency channel for the unlicensed radio frequency band; and/or the like. In some aspects, such means may include one or more components described in connection with the base station 110 of FIG. 2, such as DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
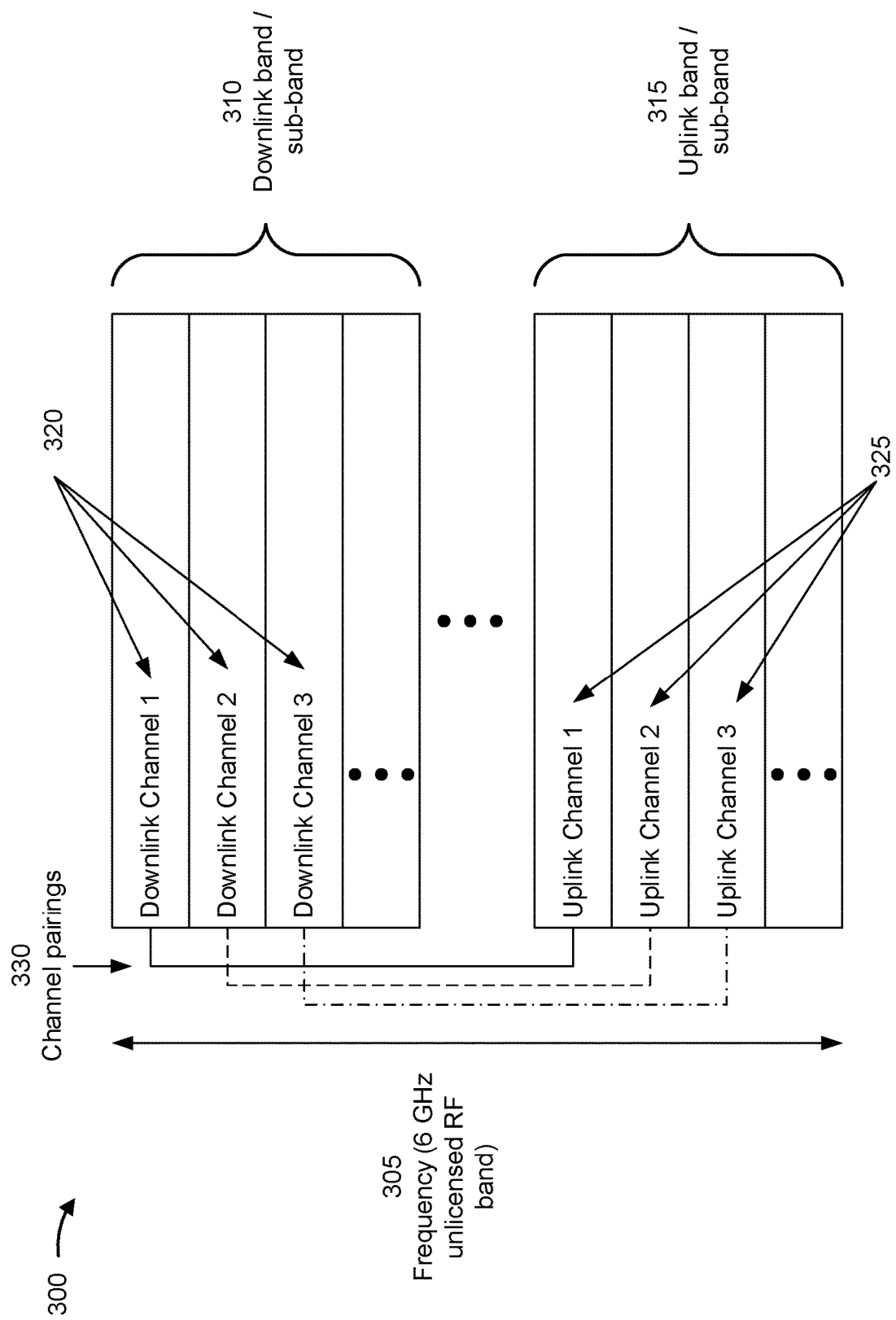
FIG. 3 is a diagram illustrating an example of an unlicensed radio frequency band, in accordance with the present disclosure.

FIG. 3 is a diagram illustrating an example 300 of an unlicensed radio frequency band, in accordance with the present disclosure.

As shown by reference number 305, an unlicensed RF band, such as a 6 gigahertz (GHz) unlicensed RF band, may span a frequency range and may utilize frequency division duplexing (FDD). In an FDD system, a first band (e.g., a first sub-band of the unlicensed RF band) may be used for downlink communication, as shown by reference number 310, and a second band (e.g., a second sub-band of the unlicensed RF band) may be used for uplink communication, as shown by reference number 315. "Downlink communication" may refer to communication from a control node to a node (e.g., that is controlled, configured, and/or scheduled by the control node), such as from a base station 110 to a UE 120, from a WLAN access point 140 to a WLAN station 150, and/or the like. "Uplink communication" may refer to communication from the node to the control node, such as from a UE 120 to a base station 110, from a WLAN station 150 to a WLAN access point 140, and/or the like.

As shown by reference number 320, the downlink band may be divided into multiple downlink channels, sometimes referred to as downlink frequency channels. Similarly, as shown by reference number 325, the uplink band may be divided into multiple uplink channels, sometimes referred to as uplink frequency channels. As shown by reference number 330, each downlink channel may correspond to a single uplink channel. This may be referred to as channel pairing, where a downlink channel is paired with an uplink channel. In this configuration, a control node and a node may use a particular downlink channel for downlink communication, and may use a particular uplink channel, that is paired with or corresponds to the particular downlink channel, for uplink communication. In example 300, downlink channel 1 is paired with uplink channel 1, downlink channel 2 is paired with uplink channel 2, downlink channel 3 is paired with uplink channel 3, and so on.

In an unlicensed RF band (e.g., the 6 GHz unlicensed RF hand), all or a portion of the frequency band may be licensed to entities referred to as fixed service incumbents. Thus, some or all of the unlicensed RF band may be reserved for use by devices associated with those fixed service incumbents. These licenses are typically local licenses and are typically limited to a particular geographic area. Thus, the availability of the unlicensed RF band may vary across different geographic regions. To protect communications of devices associated with fixed service incumbents, one or more automatic frequency coordination (AFC) devices, which may be co-located with a control node or included in a core network, may store information regarding the availability of the unlicensed RF band. Before a device that is not associated with a fixed service incumbent attempts to use the unlicensed RF band for communication, the device may request availability of the unlicensed RF band from an AFC device. The AFC device may grant or deny use of the unlicensed RF band, may indicate conditions and/or constraints on use of the unlicensed RF band, and/or the like. In this way, devices of fixed service incumbents, which are licensed to use the unlicensed RF band, may be protected against interference from other devices.

In some cases, the AFC device may use a path loss model to estimate interference, to a fixed service device, from a device requesting access to the unlicensed RF band (e.g., based at least in part on a location of the device), and may grant, deny, or specify conditions for using the unlicensed RF band based at least in part on the path loss model. However, the path loss model may be inaccurate, may not account for shadowing, may not account for whether the device requesting access is indoor or outdoor, and/or the like. As a result, some devices that would not cause significant interference to a fixed service incumbent device may be denied access to the unlicensed RF band, thereby reducing spectral efficiency. Conversely, some devices that cause significant interference to a fixed service incumbent device may be permitted to access the unlicensed RF band, thereby failing to protect fixed service incumbent devices from interference.

Some techniques and apparatuses described herein enable devices to directly measure signals from fixed service incumbents of an unlicensed RF band to determine whether the unlicensed RF band is available for use. This increases accuracy of determining whether the unlicensed RF hand is available as compared to relying on an inaccurate path loss model of an AFC device. As a result, more devices that do not cause significant interference to a fixed service incumbent device may be permitted to access the unlicensed RF band, thereby improving spectral efficiency. Furthermore, devices that would cause significant interference to a fixed service incumbent device may be denied access to the unlicensed RF band, thereby protecting fixed service incumbent devices from interference.

In some cases, a fixed service incumbent device may transmit on the unlicensed RF band regularly (e.g., continuously, for a threshold amount of time, periodically, and/or the like). Thus, a device attempting to access the unlicensed RF band may monitor for signals from the fixed service incumbent device to determine whether the unlicensed RF band is available (e.g., based at least in part on whether or not the fixed service incumbent device is transmitting). However, simply measuring an energy level on the unlicensed RF band may not be sufficient to determine whether the fixed service incumbent device is using the unlicensed RF band because other (non-incumbent devices) may also be communicating using the unlicensed RF band. Some techniques and apparatuses described herein enable a device attempting to access an unlicensed RF band to differentiate between signals received from a fixed service incumbent device and a non-incumbent device to determine whether the unlicensed RF band is available for use.

As indicated above, FIG. 3 is provided as an example. Other examples may differ from what is described with respect to FIG. 3.

Figure 4:
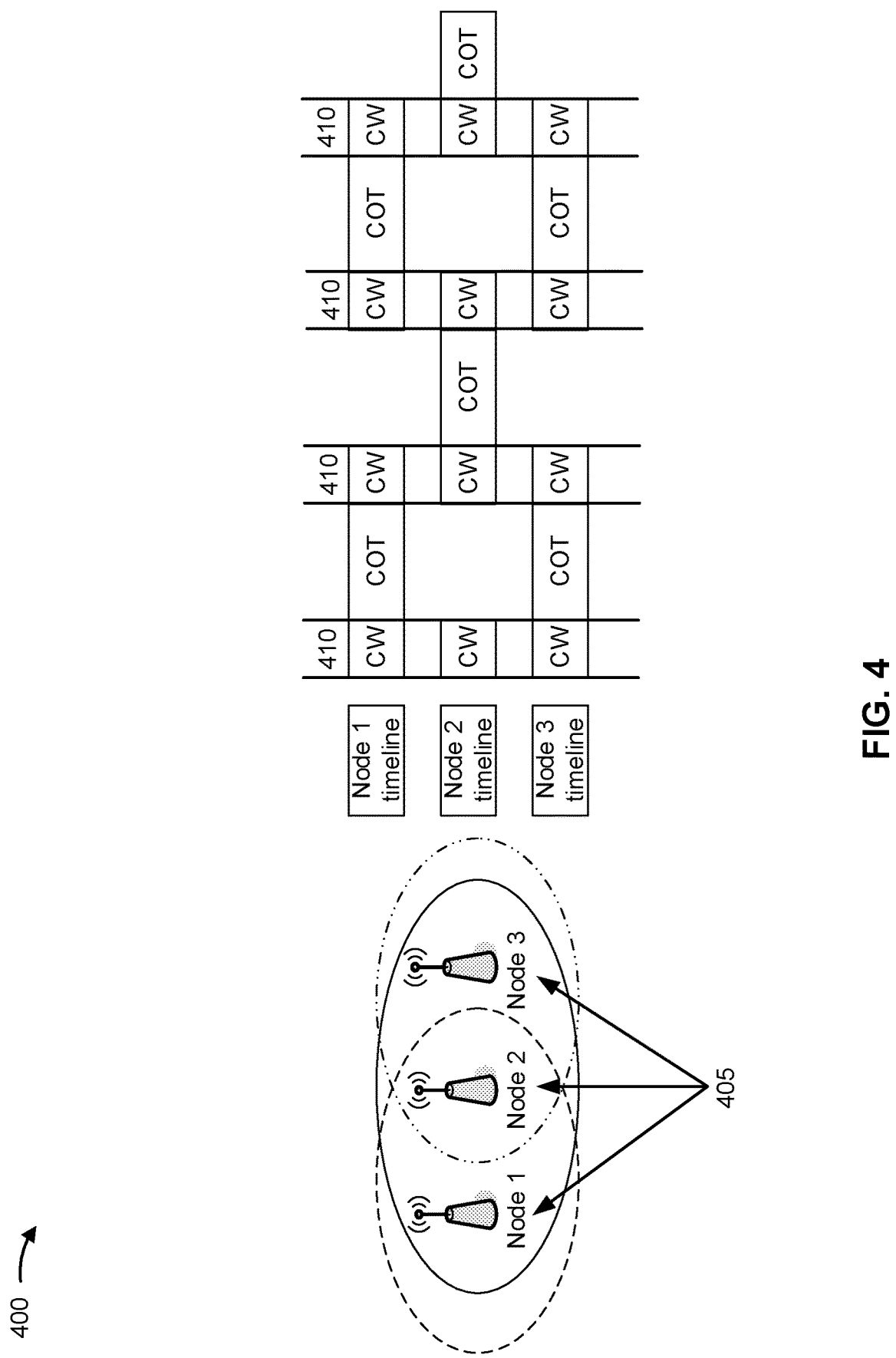
FIG. 4 is a diagram illustrating an example of synchronous communication on an unlicensed radio frequency band, in accordance with the present disclosure.

FIG. 4 is a diagram illustrating an example 400 of synchronous communication on an unlicensed radio frequency band, in accordance with the present disclosure.

As shown in FIG. 4, multiples nodes 405 may communicate using an unlicensed RF band (e.g., a 6 GHz unlicensed RF band) using synchronous communication. With synchronous communication (sometimes referred to as synchronous sharing, common clock awareness, and/or the like), a timing for communication may be aligned across different nodes. The nodes 405 may operate in a synchronous communication mode that uses synchronous reference boundaries that are based on coordinated universal time. The time between synchronous reference boundaries may be referred to as a synchronization interval (or sync interval), and may have a fixed duration (e.g., 6 milliseconds).

As an example, and as shown by reference number 410, nodes 405 operating in a synchronous communication mode may have contention windows that are aligned. The nodes may contend for access to a channel during the contention window. For example, a node 405 contending for access to the unlicensed RF band may perform a listen-before-talk (LBT) procedure to detect an energy level on a channel of the unlicensed RF band before transmitting on the channel (sometimes referred to as a clear channel assessment (CCA) procedure). If the energy level satisfies a threshold (e.g., is greater than the threshold), then the node 405 may refrain from transmitting on the channel for a period of time (e.g., shown as a channel occupancy time, or COT). If the energy level does not satisfy the threshold (e.g., is less than the threshold), then the node 405 may transmit on the channel (e.g., during the COT). In example 400, Node 1 and Node 3 may transmit at the same time because they are located far enough apart so as to not cause significant interference to one another. As further shown, Node 1 and Node 2 may not transmit at the same time because Node 1 and Node 2 are located close enough to cause significant interference to one another. Similarly, Node 2 and Node 3 may not transmit at the same time because Node 2 and Node 3 are located close enough to cause significant interference to one another.

Using this synchronization communication mode may improve channel efficiency, and may enable the nodes 405 to differentiate between signals received from a fixed service incumbent device and a non-incumbent device, as described above in connection with FIG. 3, to determine whether the unlicensed RF band is available for use. For example, the nodes 405 may use synchronized periods of silence to listen for signals from fixed service incumbent devices to determine whether the unlicensed RF band is available for use, as described in more detail below in connection with FIG. 5.

As indicated above, FIG. 4 is provided as an example. Other examples may differ from what is described with respect to FIG. 4.

Figure 5:
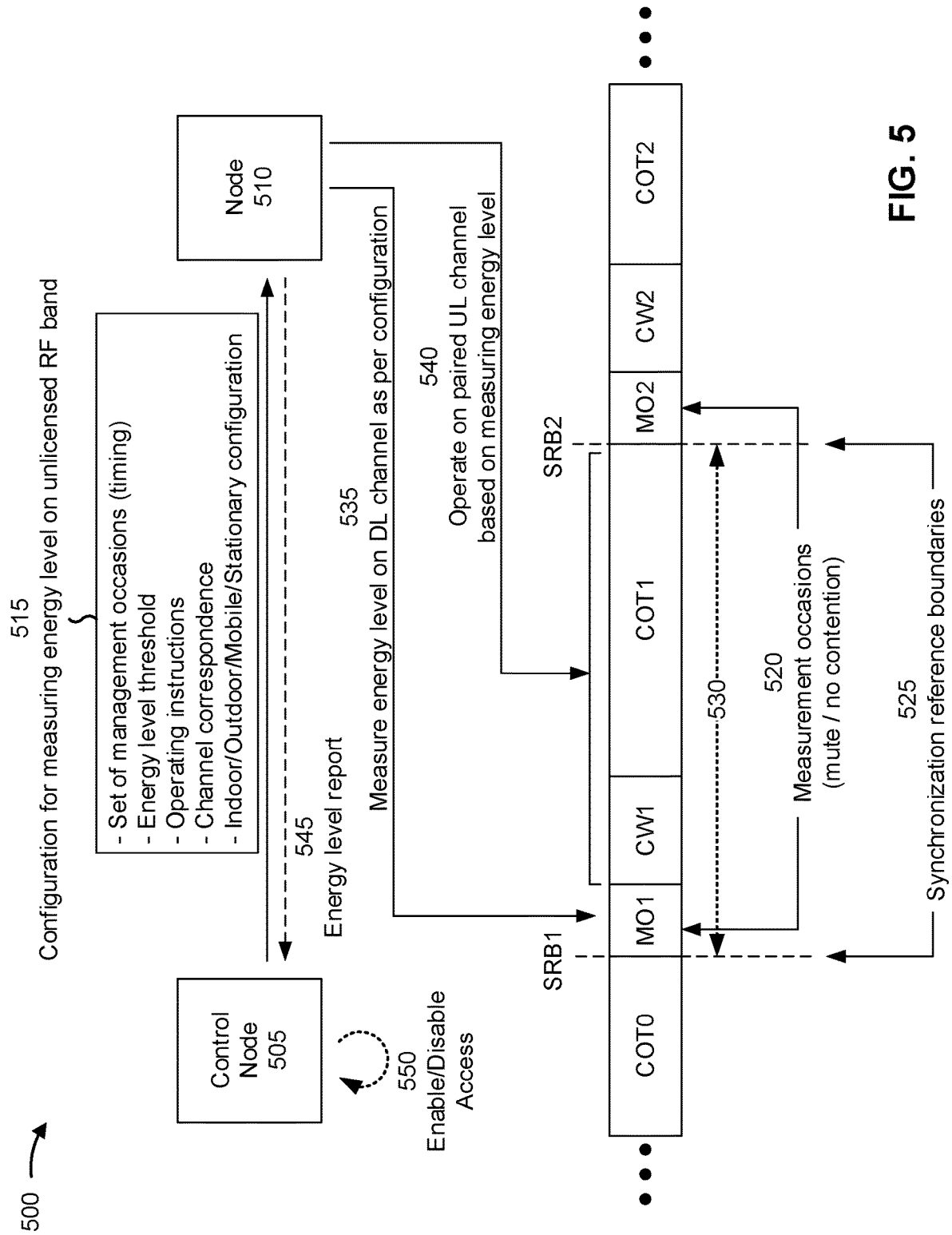
FIG. 5 is a diagram illustrating an example of detection of fixed service incumbents on an unlicensed radio frequency band, in accordance with the present disclosure.

FIG. 5 is a diagram illustrating an example 500 of detection of fixed service incumbents on an unlicensed radio frequency band, in accordance with the present disclosure.

As shown in FIG. 5, a control node 505 and a node 510 may communicate with one another. The control node 505 may include a base station 110, a WLAN access point 140 (e.g., a Wi-Fi access point), and/or the like. The node 510 may include a UE 120, a WLAN station 150 (e.g., a Wi-Fi station), and/or the like. The control node 505 and the node 510 may communicate using an unlicensed RF band, such as the 6 GHz unlicensed RF band. As described above in connection with FIG. 3, the unlicensed RF band may include multiple downlink channels and multiple uplink channels, and each downlink channel of the multiple downlink channels may be paired with a corresponding uplink channel of the multiple uplink channels.

As shown by reference number 515, the control node 505 may transmit, to the node 510, a configuration associated with measuring an energy level on an unlicensed RF band. For example, the configuration may be associated with measuring an energy level of one or more downlink channels of the unlicensed RF band (e.g., a single downlink channel of the licensed RF band, multiple downlink channels of the unlicensed RF band, and/or all downlink channels in a downlink sub-band of the unlicensed RF band).

In some aspects, the configuration may indicate a set of measurement occasions during which the node 510 is to measure an energy level of the one or more downlink channels. For example, the configuration may indicate a timing of measurement occasions included in the set of measurement occasions. In some aspects, the configuration may indicate a periodicity of the set of measurement occasions, a start time for each measurement occasion in the set of measurement occasions, a duration of each measurement occasion in the set of measurement occasions, and/or the like. As shown by reference number 520, measurement occasions may occur periodically. As shown by reference number 525, in some aspects, each measurement occasion may occur at a start of a synchronization interval bounded on either side by a synchronization reference boundary.

In some aspects, the configuration may indicate a timing of one or more synchronization reference boundaries, a duration of the synchronization interval, and/or the like. Additionally, or alternatively, if the node 510 is configured for and/or communicates using synchronous communication on the unlicensed RF band, then the node 510 may determine the timing one or more synchronization reference boundaries and/or a duration of the synchronization interval based at least in part on an internal clock, information received from an AFC device, and/or the like.

As further shown in FIG. 5, in some aspects, the configuration may indicate an energy level threshold to which the node 510 is to compare a measured energy level. Additionally, or alternatively, the configuration may include operating instructions that instruct the node 510 regarding a manner in which to operate if the measured energy level satisfies the energy level threshold and/or fails to satisfy the energy level threshold. For example, the operating instructions may indicate whether an energy level report is to be transmitted to the control node 505, a channel to be used for transmission of the energy level report, whether to combine multiple energy level measurements (e.g., for different downlink channels) into a single energy level report, whether to transmit separate energy level reports for different energy level measurements, an operation to be performed if the measured energy level satisfies the energy level threshold (e.g., whether to transmit an energy level report in this case, whether to contend for access to a downlink channel associated with the measured energy level, and/or the like), and/or an operation to be performed if the measured energy level does not satisfy the energy level threshold (e.g., whether to transmit an energy level report in this case, and/or whether to contend for access to a downlink channel associated with the measured energy level), among other examples.

As further shown in FIG. 5, in some aspects, the configuration may indicate a channel correspondence between channels (e.g., downlink channels and uplink channels) of the unlicensed RF band. For example, the configuration may indicate channel pairs, as described above in connection with FIG. 3, in some aspects, the configuration may be specific to a node 510 that is located indoors, or may be specific to a node 510 that is located outdoors. In some aspects, the configuration may include a configuration for nodes located indoors and a configuration for nodes located outdoors, and the node 510 may select the appropriate configuration depending on whether the node 510 is located indoors or outdoors. Additionally, or alternatively, the configuration may be specific to a node 510 that is stationary, or may be specific to a node 510 that is mobile. In some aspects, the configuration may include a configuration for stationary nodes and a configuration for mobile nodes, and the node 510 may select the appropriate configuration depending on whether the node 510 is stationary or mobile. In some aspects, stationary nodes may be configured with a set of measurement occasions that have a lower periodicity (e.g., occur less often) than mobile nodes.

In some aspects, the configuration may be specific to a particular pair of channels or a subset of pairs of channels of the unlicensed RE band. In this case, the control node 505 may transmit multiple configurations described above, with one configuration for each pair of channels or each subset of pairs of channels of the unlicensed RE band. Alternatively, the configuration may apply to all pairs of channels of the unlicensed RE band. In this case, the control node 505 may transmit a single configuration to be applied to all pairs of channels. In some aspects, the configuration may indicate one or more pairs of channels to which the configuration is to be applied. Additionally, or alternatively, the configuration may indicate whether the configuration is to be applied to all pairs of channels of the unlicensed RF band.

As shown by reference number 530, a time interval between two time boundaries a synchronization interval between two synchronization reference boundaries) may include a measurement occasion (shown as MO1), which may be followed by a contention window (shown as CW1), which may be followed by a channel occupancy time (shown as COT1). The measurement occasion may occur at the beginning of the time interval. During the measurement occasion, the node 510 may refrain from transmitting and/or may refrain from contending for access to the unlicensed RF band and/or the specific channel(s) to be measured during the measurement occasion. In some aspects, the node 510 and one or more other nodes (e.g., including the control node 505 and/or one or more nodes other than the control node 505) may be configured for synchronous communication, as described above in connection with FIG. 4. In this case, all of the nodes configured for synchronous communication (e.g., which may include the control node 505) may be configured to refrain from transmitting and/or refraining from contending for access to the unlicensed RF band and/or the specific channel(s) to be measured during the measurement occasion. In this way, the nodes may monitor for signals from a fixed service incumbent device with no or less interference from other devices.

As shown by reference number 535, during the measurement occasion, the node 510 may measure an energy level on one or more downlink channels. In some aspects, such measurements may be performed according to the configuration. As shown by reference number 540, the node 510 may operate in association with one or more uplink channels, corresponding to the one or more downlink channels, based at least in part on measuring the energy level of the one or more downlink channels. In some aspects, the node 510 may selectively contend for access to the one or more uplink channels based at least in part on the measured energy level on the one or more downlink channels.

Using a single downlink channel as an example, if the node 510 determines that the energy level measured on the downlink channel satisfies a threshold (e.g., is greater than a threshold, is greater than or equal to a threshold, and/or the like), then the node 510 may refrain from contending for access to an uplink channel that is paired with the downlink channel. For example, the node 510 may refrain from contending for access to the uplink channel for a time period that follows the measurement occasion if the node 510 determines that the measured energy level on the downlink channel satisfies the threshold. In some aspects, the time period starts at the end of the measurement period. In some aspects, the time period includes a contention window (e.g., CW1) and a channel occupancy time (e.g., COT1). In some aspects, the time period ends at the start of a next consecutive measurement occasion (e.g., shown as MO2) and/or ends at the next synchronization reference boundary (e.g., shown as SRB2). "Next consecutive measurement occasion" may refer to a measurement occasion that follows the measurement occasion during which the energy level for a channel was measured, without any intervening measurement occasions for that channel.

Alternatively, if the node 510 determines that the energy level measured on the downlink channel does not satisfy a threshold (e.g., is less than a threshold, is less than or equal to a threshold, and/or the like), then the node 510 may contend for access to an uplink channel that is paired with the downlink channel. For example, the node 510 may contend for access to the uplink channel during a time period that follows the measurement occasion if the node 510 determines that the measured energy level on the downlink channel does not satisfy the threshold. For example, the node 510 may contend for access to the uplink channel during CW1. In some aspects, the time period may be defined as described above.

As shown by reference number 545, in some aspects, the node 510 may transmit a report (e.g., an energy level report) to the control node 505. The report may indicate an energy level measured by the node 510 on a single downlink channel, multiple energy levels measured by the node 510 on a corresponding multiple downlink channels, an average energy level measured by the node 510 across multiple downlink channels, and/or the like. In some aspects, the node 510 may transmit a report, that indicates a measured energy level for a downlink channel, on an uplink channel that is paired with the downlink channel. In some aspects, the node 510 may identify an uplink channel for which a corresponding downlink channel has a measured energy level that is less than a threshold, and may transmit reports for one or more measured energy levels on that uplink channel (e.g., a measured energy level for the corresponding downlink channel, a measured energy level for one or more downlink channels for which the measured energy level satisfies a threshold, and/or the like).

In some aspects, the node 510 may transmit the report regardless of the measured energy level. Alternatively, the node 510 may transmit the report if the measured energy level satisfies a threshold, and may refrain from transmitting the report if the measured energy level does not satisfy the threshold. In some aspects, if the measured energy level for a downlink channel satisfies a threshold, then the node 510 may refrain from transmitting on an uplink channel that is paired with that downlink channel for a time period that follows transmission of the report (e.g., assuming that the node 510 transmits the report on the uplink channel). In some aspects, the time period may be defined as described above.

As shown by reference number 550, the control node 505 may selectively disable (e.g., may enable or disable) access to an uplink channel corresponding to a downlink channel for which a reported energy level satisfies a threshold. For example, if a reported energy level for a downlink channel satisfies a threshold, then the control node 505 may disable access to the downlink channel by the node 510. In some aspects, the control node 505 may disable access to the downlink channel for a time period, which may be defined as described above. Alternatively, if a reported energy level for a downlink channel does not satisfy a threshold, then the control node 505 may enable access to the downlink channel by the node 510. In some aspects, the control node 505 may enable access to the downlink channel for a time period, which may be defined as described above.

In this way, the node 510 may be able to directly measure signals from fixed service incumbents of an unlicensed RF band to determine whether the unlicensed RF band is available for use. This increases accuracy of determining whether the unlicensed RF band is available as compared to relying on an inaccurate path loss model of an AFC device. As a result, more devices that do not cause significant interference to a fixed service incumbent device may be permitted to access the unlicensed RF band, thereby improving spectral efficiency. Furthermore, devices that would cause significant interference to a fixed service incumbent device may be denied access to the unlicensed RF band, thereby protecting fixed service incumbent devices from interference.

As indicated above, FIG. 5 is provided as an example. Other examples may differ from what is described with respect to FIG. 5.

Figure 6:
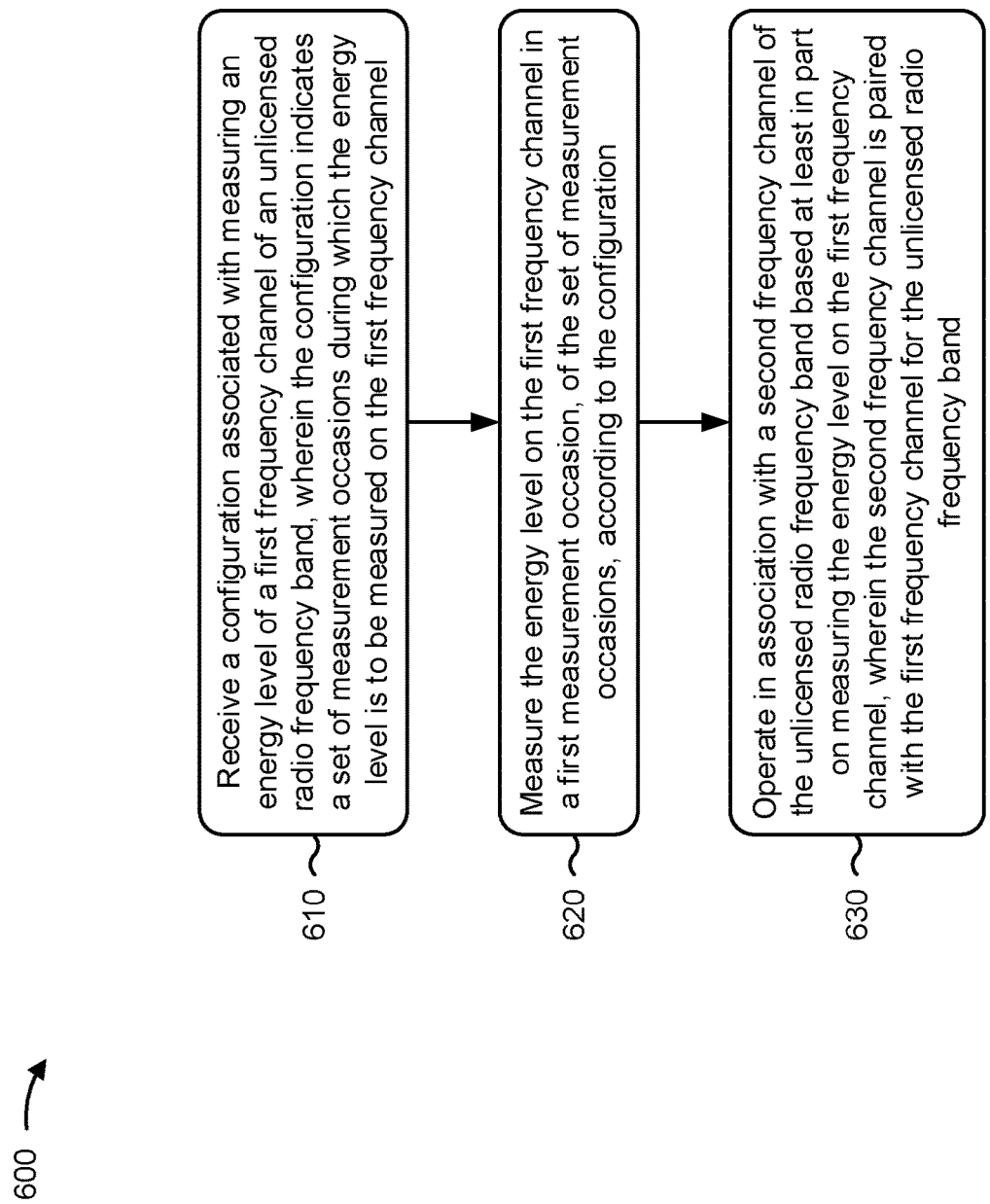
FIG. 6 is a diagram illustrating an example process performed, for example, by a node, in accordance with the present disclosure.

FIG. 6 is a diagram illustrating an example process 600 performed, for example, by a node, in accordance with the present disclosure. Example process 600 is an example where the node (e.g., node 405, node 510, UE 120, WLAN station 150, and/or the like) performs operations associated with detection of fixed service incumbents on an unlicensed radio frequency band.

As shown in FIG. 6, in some aspects, process 600 may include receiving a configuration associated with measuring an energy level of a first frequency channel of an unlicensed radio frequency band, wherein the configuration indicates a set of measurement occasions during which the energy level is to be measured on the first frequency channel (block 610). For example, the node (e.g., using controller/processor 280, antenna 252, receive processor 258, and/or the like) may receive a configuration associated with measuring an energy level of a first frequency channel of an unlicensed radio frequency band, as described above. In some aspects, the configuration indicates a set of measurement occasions during which the energy level is to be measured on the first frequency channel.

As further shown in FIG. 6, in some aspects, process 600 may include measuring the energy level on the first frequency channel in a first measurement occasion, of the set of measurement occasions, according to the configuration (block 620). For example, the node (e.g., using controller/processor 280, antenna 252, receive processor 258, and/or the like) may measure the energy level on the first frequency channel in a first measurement occasion, of the set of measurement occasions, according to the configuration, as described above.

As further shown in FIG. 6, in some aspects, process 600 may include operating in association with a second frequency channel of the unlicensed radio frequency band based at least in part on measuring the energy level on the first frequency channel, wherein the second frequency channel is paired with the first frequency channel for the unlicensed radio frequency band (block 630). For example, the node (e.g., using controller/processor 280, transmit processor 264, antenna 252, receive processor 258, and/or the like) may operate in association with a second frequency channel of the unlicensed radio frequency band based at least in part on measuring the energy level on the first frequency channel, as described above. In some aspects, the second frequency channel is paired with the first frequency channel for the unlicensed radio frequency band.

Process 600 may include additional aspects, such as any single aspect or any combination of aspects described below and/or in connection with one or more other processes described elsewhere herein.

In a first aspect, the node and one or more other nodes are configured to refrain from transmitting and to refrain from contending for access to the unlicensed radio frequency band during the set of measurement occasions.

In a second aspect, alone or in combination with the first aspect, the node and the one or more other nodes are configured for synchronous communication on the unlicensed radio frequency band.

In a third aspect, alone or in combination with one or more of the first and second aspects, the unlicensed radio frequency band includes multiple downlink channels, including the first frequency channel, and multiple uplink channels, including the second frequency channel, and each downlink channel of the multiple downlink channels is paired with a corresponding uplink channel of the multiple uplink channels.

In a fourth aspect, alone or in combination with one or more of the first through third aspects, the operating is specific to the second frequency channel, and not any other uplink channels of the multiple uplink channels, based at least in part on the second frequency channel being paired with the first frequency channel.

In a fifth aspect, alone or in combination with one or more of the first through fourth aspects, the set of measurement occasions is specific to the first frequency channel.

In a sixth aspect, alone or in combination with one or more of the first through fifth aspects, the operating comprises transmitting a report, on at least one uplink channel of the unlicensed radio frequency hand, that indicates the energy level measured on the first frequency channel.

In a seventh aspect, alone or in combination with one or more of the first through sixth aspects, process 600 includes refraining from transmitting on the second frequency channel for a time period that follows transmission of the report based at least in part on a determination that the energy level satisfies a threshold.

In an eighth aspect, alone or in combination with one or more of the first through seventh aspects, the time period ends at a second measurement occasion, of the set of measurement occasions, that follows the first measurement occasion without any intervening measurement occasions of the set of measurement occasions.

In a ninth aspect, alone or in combination with one or more of the first through eighth aspects, the operating comprises selectively contending for access to the second frequency channel during a time period that follows the first measurement occasion based at least in part on whether the energy level satisfies a threshold.

In a tenth aspect, alone or in combination with one or more of the first through ninth aspects, selectively contending for access comprises: refraining from contending for access to the second frequency channel for the time period if the energy level satisfies the threshold, or contending for access to the second frequency channel during the time period if the energy level does not satisfy the threshold.

In an eleventh aspect, alone or in combination with one or more of the first through tenth aspects, the time period ends at a second measurement occasion, of the set of measurement occasions, that follows the first measurement occasion without any intervening measurement occasions of the set of measurement occasions.

In a twelfth aspect, alone or in combination with one or more of the first through eleventh aspects, the node includes at least one of a user equipment, a station, or a WLAN station.

In a thirteenth aspect, alone or in combination with one or more of the first through twelfth aspects, the configuration is received from at least one of a base station, a access point, or a WLAN access point.

In a fourteenth aspect, alone or in combination with one or more of the first through thirteenth aspects, the configuration indicates at least one of: a periodicity of the set of measurement occasions, a start time for each measurement occasion of the set of measurement occasions, a duration of each measurement occasion of the set of measurement occasions, a threshold to which the energy level is to be compared, a correspondence between the first frequency channel and the second frequency channel, or a combination thereof.

In a fifteenth aspect, alone or in combination with one or more of the first through fourteenth aspects, the configuration is based at least in part on whether the node is a stationary node or a mobile node.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
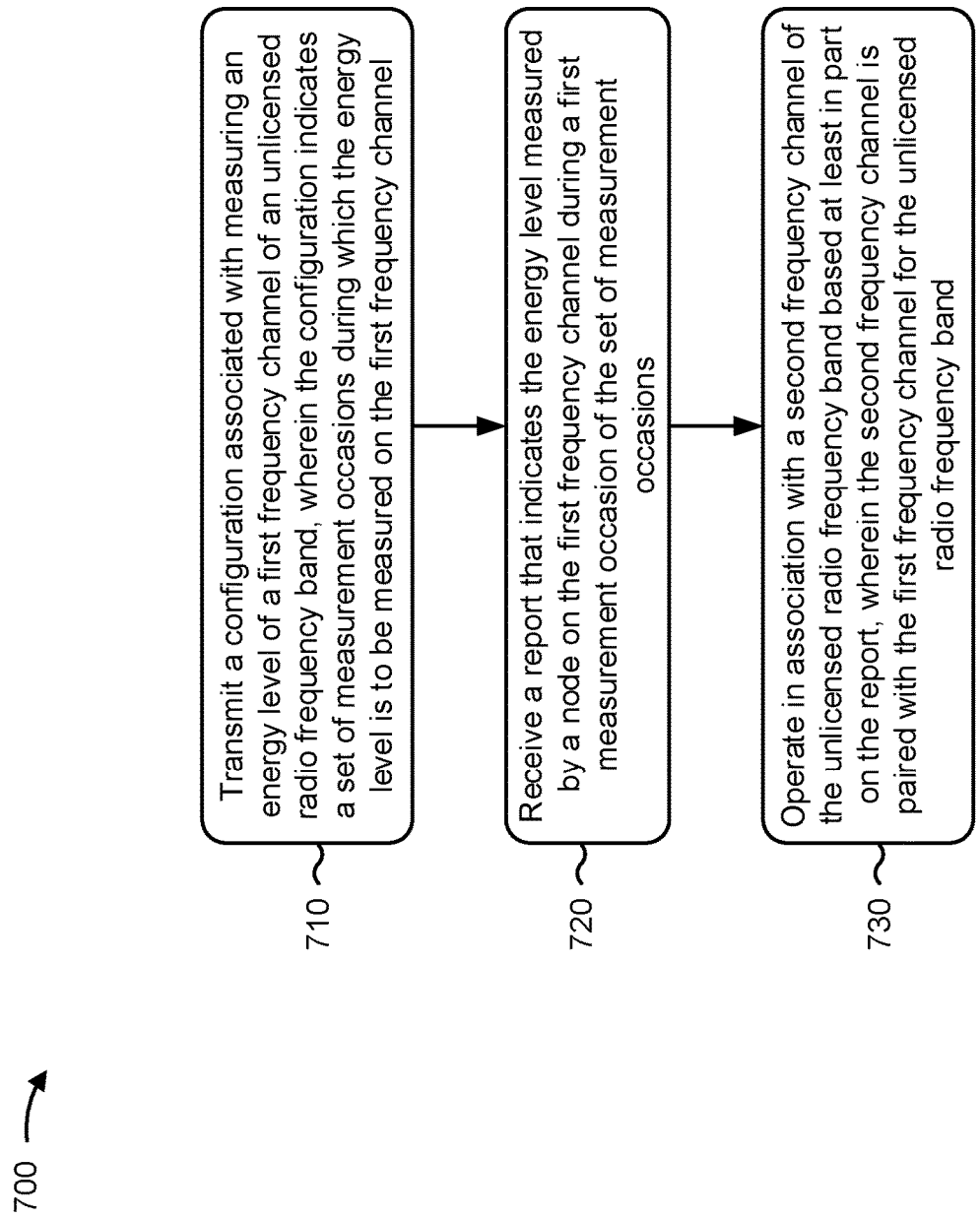
FIG. 7 is a diagram illustrating an example process performed, for example, by a control node, in accordance with the present disclosure.

FIG. 7 is a diagram illustrating an example process 700 performed, for example, by a control node, in accordance with the present disclosure. Example process 700 is an example where the control node (e.g., node 405, control node 505, base station 110, WLAN access point 140, and/or the like) performs operations associated with detection of fixed service incumbents on an unlicensed radio frequency band.

As shown in FIG. 7, in some aspects, process 700 may include transmitting a configuration associated with measuring an energy level of a first frequency channel of an unlicensed radio frequency band, wherein the configuration indicates a set of measurement occasions during which the energy level is to be measured on the first frequency channel (block 710). For example, the control node (e.g., using controller/processor 240, transmit processor 220, antenna 234, and/or the like) may transmit a configuration associated with measuring an energy level of a first frequency channel of an unlicensed radio frequency band, as described above. In some aspects, the configuration indicates a set of measurement occasions during which the energy level is to be measured on the first frequency channel.

As further shown in FIG. 7, in some aspects, process 700 may include receiving a report, on at least one uplink channel of the unlicensed radio frequency band, that indicates the energy level measured by a node on the first frequency channel during a first measurement occasion of the set of measurement occasions (block 720). For example, the control node (e.g., using receive processor 238, controller/processor 240, antenna 234, and/or the like) may receive a report, on at least one uplink channel of the unlicensed radio frequency band, that indicates the energy level measured by a node on the first frequency channel during a first measurement occasion of the set of measurement occasions, as described above.

As further shown in FIG. 7, in some aspects, process 700 may include operating in association with a second frequency channel of the unlicensed radio frequency band based at least in part on the report, wherein the second frequency channel is paired with the first frequency channel for the unlicensed radio frequency band (block 730). For example, the control node (e.g., using receive processor 238, controller/processor 240, transmit processor 220, antenna 234, and/or the like) may operate in association with a second frequency channel of the unlicensed radio frequency band based at least in part on the report, as described above. In some aspects, the second frequency channel is paired with the first frequency channel for the unlicensed radio frequency band.

Process 700 may include additional aspects, such as any single aspect or any combination of aspects described below and/or in connection with one or more other processes described elsewhere herein.

In a first aspect, the operating comprises selectively disabling access to the second frequency channel for the node during a time period that follows the first measurement occasion based at least in part on whether the energy level satisfies a threshold.

In a second aspect, alone or in combination with the first aspect, selectively disabling access comprises: disabling access to the second frequency channel for the time period if the energy level satisfies the threshold, or enabling access to the second frequency channel during the time period if the energy level does not satisfy the threshold.

In a third aspect, alone or in combination with one or more of the first and second aspects, the time period ends at a second measurement occasion, of the set of measurement occasions, that follows the first measurement occasion without any intervening measurement occasions of the set of measurement occasions.

In a fourth aspect, alone or in combination with one or more of the first through third aspects, at least one of the control node or the node is configured to refrain from transmitting and to refrain from contending for access to the unlicensed radio frequency band during the set of measurement occasions.

In a fifth aspect, alone or in combination with one or more of the first through fourth aspects, the control node and the node are configured for synchronous communication on the unlicensed radio frequency band.

In a sixth aspect, alone or in combination with one or more of the first through fifth aspects, the unlicensed radio frequency band includes multiple downlink channels, including the first frequency channel, and multiple uplink channels, including the second frequency channel, and each downlink channel of the multiple downlink channels is paired with a corresponding uplink channel of the multiple uplink channels.

In a seventh aspect, alone or in combination with one or more of the first through sixth aspects, the operating is specific to the second frequency channel, and not any other uplink channels of the multiple uplink channels, based at least in part on the second frequency channel being paired with the first frequency channel.

In an eighth aspect, alone or in combination with one or more of the first through seventh aspects, the set of measurement occasions is specific to the first frequency channel.

In a ninth aspect, alone or in combination with one or more of the first through eighth aspects, the control node includes at least one of a base station, a Wi-Fi access point, or a WLAN access point.

In a tenth aspect, alone or in combination with one or more of the first through ninth aspects, the configuration indicates at least one of: a periodicity of the set of measurement occasions, a start time for each measurement occasion of the set of measurement occasions, a duration of each measurement occasion of the set of measurement occasions, a threshold to which the energy level is to be compared, a correspondence between the first frequency channel and the second frequency channel, or a combination thereof.

In an eleventh aspect, alone or in combination with one or more of the first through tenth aspects, the configuration is based at least in part on whether the node is a stationary node or a mobile node.

Although FIG. 7 shows example blocks of process 700, in some aspects, process 760 may include additional blocks, fewer blocks, different blocks, or differently arranged blocks than those depicted in FIG. 7. Additionally, or alternatively, two or more of the blocks of process 700 may be performed in parallel.

The following provides an overview of some aspects of the present disclosure:

Aspect 1: A method of wireless communication performed by a node, comprising: receiving a configuration associated with measuring an energy level of a first frequency channel of an unlicensed radio frequency band, wherein the configuration indicates a set of measurement occasions during which the energy level is to be measured on the first frequency channel; measuring the energy level on the first frequency channel in a first measurement occasion, of the set of measurement occasions, according to the configuration; and operating in association with a second frequency channel of the unlicensed radio frequency band based at least in part on measuring the energy level on the first frequency channel, wherein the second frequency channel is paired with the first frequency channel for the unlicensed radio frequency band.

Aspect 2: The method of aspect 1, wherein the node and one or more other nodes are configured to refrain from transmitting and to refrain from contending for access to the unlicensed radio frequency band during the set of measurement occasions.

Aspect 3: The method of aspect 2, wherein the node and the one or more other nodes are configured for synchronous communication on the unlicensed radio frequency band.

Aspect 4: The method of any of aspects 1-3, wherein the unlicensed radio frequency band includes multiple downlink channels, including the first frequency channel, and multiple uplink channels, including e second frequency channel, and wherein each downlink channel of the multiple downlink channels is paired with a corresponding uplink channel of the multiple uplink channels.

Aspect 5: The method of aspect 4, wherein the operating is specific to the second frequency channel, and not any other uplink channels of the multiple uplink channels, based at least in part on the second frequency channel being paired with the first frequency channel.

Aspect 6: The method of aspect 4, wherein the set of measurement occasions is specific to the first frequency channel.

Aspect 7: The method of any of aspects 1-6, wherein the operating comprises transmitting a report, on at least one uplink channel of the unlicensed radio frequency band, that indicates the energy level measured on the first frequency channel.

Aspect 8: The method of aspect 7, further comprising refraining from transmitting on the second frequency channel for a time period that follows transmission of the report based at least in part on a determination that the energy level satisfies a threshold.

Aspect 9: The method of aspect 8, wherein the time period ends at a second measurement occasion, of the set of measurement occasions, that follows the first measurement occasion without any intervening measurement occasions of the set of measurement occasions.

Aspect 10: The method of any of aspects 1-9, wherein the operating comprises selectively contending for access to the second frequency channel during a time period that follows the first measurement occasion based at least in part on whether the energy level satisfies a threshold.

Aspect 11: The method of aspect 10, wherein selectively contending for access comprises: refraining from contending for access to the second frequency channel for the time period if the energy level satisfies the threshold, or contending for access to the second frequency channel during the time period if the energy level does not satisfy the threshold.

Aspect 12: The method of any of aspects 10-11, wherein the time period ends at a second measurement occasion, of the set of measurement occasions, that follows the first measurement occasion without any intervening measurement occasions of the set of measurement occasions.

Aspect 13: The method of any of aspects 1-12, wherein the node includes at least one of a user equipment, a Wi-Fi station, or a wireless local area network (WLAN) station.

Aspect 14: The method of any of aspects 1-13, wherein the configuration is received from at least one of a base station, a Wi-Fi access point, or a wireless local area network (WLAN) access point.

Aspect 15: The method of any of aspects 1-14, wherein the configuration indicates at least one of: a periodicity of the set of measurement occasions, a start time for each measurement occasion of the set of measurement occasions, a duration of each measurement occasion of the set of measurement occasions, a threshold to which the energy level is to be compared, a correspondence between the first frequency channel and the second frequency channel, or a combination thereof.

Aspect 16: The method of any of aspects 1-15, wherein the configuration is based at least in part on whether the node is a stationary node or a mobile node.

Aspect 17: A method of wireless communication performed by a control node, comprising: transmitting a configuration associated with measuring an energy level of a first frequency channel of an unlicensed radio frequency band, wherein the configuration indicates a set of measurement occasions during which the energy level is to be measured on the first frequency channel; receiving a report, on at least one uplink channel of the unlicensed radio frequency band, that indicates the energy level measured by a node on the first frequency channel during a first measurement occasion of the set of measurement occasions; and operating in association with a second frequency channel of the unlicensed radio frequency band based at least in part on the report, wherein the second frequency channel is paired with the first frequency channel for the unlicensed radio frequency band.

Aspect 18: The method of aspect 17, wherein the operating comprises selectively disabling access to the second frequency channel for the node during a time period that follows the first measurement occasion based at least in part on whether the energy level satisfies a threshold.

Aspect 19: The method of aspect 18, wherein selectively disabling access comprises: disabling access to the second frequency channel for the time period if the energy level satisfies the threshold, or enabling access to the second frequency channel during the time period if the energy level does not satisfy the threshold.

Aspect 20: The method of any of aspects 18-19, wherein the time period ends at a second measurement occasion, of the set of measurement occasions, that follows the first measurement occasion without any intervening measurement occasions of the set of measurement occasions.

Aspect 21: The method of any of aspects 17-20, wherein at least one of the control node or the node is configured to refrain from transmitting and to refrain from contending for access to the unlicensed radio frequency band during the set of measurement occasions.

Aspect 22: The method of aspect 21, wherein the control node and the node are configured for synchronous communication on the unlicensed radio frequency band.

Aspect 23: The method of any of aspects 17-22, wherein the unlicensed radio frequency band includes multiple downlink channels, including the first frequency channel, and multiple uplink channels, including the second frequency channel, and wherein each downlink channel of the multiple downlink channels is paired with a corresponding uplink channel of the multiple uplink channels.

Aspect 24: The method of aspect 23, wherein the operating is specific to the second frequency channel, and not any other uplink channels of the multiple uplink channels, based at least in part on the second frequency channel being paired with the first frequency channel.

Aspect 25: The method of aspect 23, wherein the set of measurement occasions is specific to the first frequency channel.

Aspect 26: The method of any of aspects 17-25, wherein the control node includes at least one of a base station, a Wi-Fi access point, or a wireless local area network (WLAN) access point.

Aspect 27: The method of any of aspects 17-26, wherein the configuration indicates at least one of: a periodicity of the set of measurement occasions, a start time for each measurement occasion of the set of measurement occasions, a duration of each measurement occasion of the set of measurement occasions, a threshold to which the energy level is to be compared, a correspondence between the first frequency channel and the second frequency channel, or a combination thereof.

Aspect 28: The method of any of aspects 17-27, wherein the configuration is based at least in part on whether the node is a stationary node or a mobile node.

Aspect 29: An apparatus for wireless communication at a device, comprising a processor; memory coupled with the processor; and instructions stored in the memory and executable by the processor to cause the apparatus to perform the method of one or more aspects of aspects 1-28.

Aspect 30: A device for wireless communication, comprising a memory and one or more processors coupled to the memory, the memory and the one or more processors configured to perform the method of one or more aspects of aspects 1-16.

Aspect 31: An apparatus for wireless communication, comprising at least one means for performing the method of one or more aspects of aspects 1-16.

Aspect 32: A non-transitory computer-readable medium storing code for wireless communication, the code comprising instructions executable by a processor to perform the method of one or more aspects of aspects 1-16.

Aspect 33: A non-transitory computer-readable medium storing a set of instructions for wireless communication, the set of instructions comprising one or more instructions that, when executed by one or more processors of a device, cause the device to perform the method of one or more aspects of aspects 1-16.

Aspect 34: An apparatus for wireless communication at a device, comprising a processor; memory coupled with the processor; and instructions stored in the memory and executable by the processor to cause the apparatus to perform the method of one or more aspects of aspects 17-28.

Aspect 35: A device for wireless communication, comprising a memory and one or more processors coupled to the memory, the memory and the one or more processors configured to perform the method of one or more aspects of aspects 17-28.

Aspect 36: An apparatus for wireless communication, comprising at least one means for performing the method of one or more aspects of aspects 17-28.

Aspect 37: A non-transitory computer-readable medium storing code for wireless communication, the code comprising instructions executable by a processor to perform the method of one or more aspects of aspects 17-28.

Aspect 38: A non-transitory computer-readable medium storing a set of instructions for wireless communication, the set of instructions comprising one or more instructions that, when executed by one or more processors of a device, cause the device to perform the method of one or more aspects of aspects 17-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a node, comprising:
    receiving a configuration associated with measuring an energy level of a first frequency channel of an unlicensed radio frequency band, wherein the configuration indicates a set of measurement occasions during which the energy level is to be measured on the first frequency channel;
    measuring the energy level on the first frequency channel in a first measurement occasion, of the set of measurement occasions, according to the configuration; and
    operating in association with a second frequency channel of the unlicensed radio frequency band based at least in part on measuring the energy level on the first frequency channel, wherein the second frequency channel is paired with the first frequency channel for the unlicensed radio frequency band.

2. The method of claim 1, wherein the node and one or more other nodes are configured to refrain from transmitting and to refrain from contending for access to the unlicensed radio frequency band during the set of measurement occasions.

3. The method of claim 2, wherein the node and the one or more other nodes are configured for synchronous communication on the unlicensed radio frequency band.

4. The method of claim 1, wherein the unlicensed radio frequency band includes multiple downlink channels, including the first frequency channel, and multiple uplink channels, including the second frequency channel, and wherein each downlink channel of the multiple downlink channels is paired with a corresponding uplink channel of the multiple uplink channels.

5. The method of claim 4, wherein the operating is specific to the second frequency channel, and not any other uplink channels of the multiple uplink channels, based at least in part on the second frequency channel being paired with the first frequency channel.

6. The method of claim 4, wherein the set of measurement occasions is specific to the first frequency channel.

7. The method of claim 1, wherein the operating comprises transmitting a report, on at least one uplink channel of the unlicensed radio frequency band, that indicates the energy level measured on the first frequency channel.

8. The method of claim 7, further comprising refraining from transmitting on the second frequency channel for a time period that follows transmission of the report based at least in part on a determination that the energy level satisfies a threshold.

9. The method of claim 1, wherein the operating comprises selectively contending for access to the second frequency channel during a time period that follows the first measurement occasion based at least in part on whether the energy level satisfies a threshold.

10. The method of claim 9, wherein selectively contending for access comprises:
    refraining from contending for access to the second frequency channel for the time period if the energy level satisfies the threshold, or
    contending for access to the second frequency channel during the time period if the energy level does not satisfy the threshold.

11. The method of claim 1, wherein the configuration indicates at least one of:
    a periodicity of the set of measurement occasions,
    a start time for each measurement occasion of the set of measurement occasions,
    a duration of each measurement occasion of the set of measurement occasions,
    a threshold to which the energy level is to be compared,
    a correspondence between the first frequency channel and the second frequency channel, or
    a combination thereof.

12. The method of claim 1, wherein the configuration is based at least in part on whether the node is a stationary node or a mobile node.

13. A node for wireless communication, comprising:
    a memory; and
    one or more processors operatively coupled to the memory, the memory and the one or more processors configured to:
        receive a configuration associated with measuring an energy level of a first frequency channel of an unlicensed radio frequency band, wherein the configuration indicates a set of measurement occasions during which the energy level is to be measured on the first frequency channel;

measure the energy level on the first frequency channel in a first measurement occasion, of the set of measurement occasions, according to the configuration; and operate in association with a second frequency channel of the unlicensed radio frequency band based at least in part on measuring the energy level on the first frequency channel, wherein the second frequency channel is paired with the first frequency channel for the unlicensed radio frequency band.

14. The node of claim 13, wherein the node and one or more other nodes are configured to refrain from transmitting and to refrain from contending for access to the unlicensed radio frequency band during the set of measurement occasions.

15. The node of claim 14, wherein the node and the one or more other nodes are configured for synchronous communication on the unlicensed radio frequency band.

16. The node of claim 13, wherein the unlicensed radio frequency band includes multiple downlink channels, including the first frequency channel, and multiple uplink channels, including the second frequency channel, and wherein each downlink channel of the multiple downlink channels is paired with a corresponding uplink channel of the multiple uplink channels.

17. The node of claim 16, wherein the operating is specific to the second frequency channel, and not any other uplink channels of the multiple uplink channels, based at least in part on the second frequency channel being paired with the first frequency channel.

18. The node of claim 16, wherein the set of measurement occasions is specific to the first frequency channel.

19. The node of claim 13, wherein the memory and the one or more processors, when operating in association with a second frequency channel, are further configured to transmit a report, on at least one uplink channel of the unlicensed radio frequency band, that indicates the energy level measured on the first frequency channel.

20. The node of claim 19, wherein the memory and the one or more processors are further configured to refrain from transmitting on the second frequency channel for a tune period that follows transmission of the report based at least in part on a determination that the energy level satisfies a threshold.

21. The node of claim 13, wherein the memory and the one or more processors, when operating in association with a second frequency channel, are further configured to selectively contend for access to the second frequency channel during a time period that follows the first measurement occasion based at least in part on whether the energy level satisfies a threshold.

22. The node of claim 21, wherein the memory and the one or more processors, when selectively contending for access, are further configured to:
refrain from contending for access to the second frequency channel for the time period if the energy level satisfies the threshold, or
contend for access to the second frequency channel during the time period if the energy level does not satisfy the threshold.

23. The node of claim 13, wherein the configuration indicates at least one of:
a periodicity of the set of measurement occasions,
a start time for each measurement occasion of the set of measurement occasions,
a duration of each measurement occasion of the set of measurement occasions,
a threshold to which the energy level is to be compared,
a correspondence between the first frequency channel and the second frequency channel, or
a combination thereof.

24. The node of claim 13, wherein the configuration is based at least in part on whether the node is a stationary node or a mobile node.

25. A non-transitory computer-readable medium storing one or more instructions for wireless communication, the one or more instructions comprising:
one or more instructions that, when executed by one or more processors of a node, cause the node to:
receive a configuration associated with measuring an energy level of a first frequency channel of an unlicensed radio frequency band, wherein the configuration indicates a set of measurement occasions during which the energy level is to be measured on the first frequency channel;
measure the energy level on the first frequency channel in a first measurement occasion, of the set of measurement occasions, according to the configuration; and
operate in association with a second frequency channel of the unlicensed radio frequency band based at least in part on measuring the energy level on the first frequency channel, wherein the second frequency channel is paired with the first frequency channel for the unlicensed radio frequency band.

26. The non-transitory computer-readable medium of claim 25, wherein the one or more instructions, that when executed by one or more processors cause the node to operate in association with the second frequency channel, further cause the node to selectively contend for access to the second frequency channel during a time period that follows the first measurement occasion based at least in part on whether the energy level satisfies a threshold.

27. The non-transitory computer-readable medium of claim 26, wherein the one or more instructions, that when executed by the one or more processors cause the node to selectively contend for access, further cause the node to:
refrain from contending for access to the second frequency channel for the time period if the energy level satisfies the threshold, or
contend for access to the second frequency channel during the time period if the energy level does not satisfy the threshold.

28. An apparatus for wireless communication, comprising:
means for receiving a configuration associated with measuring an energy level of a first frequency channel of an unlicensed radio frequency band, wherein the configuration indicates a set of measurement occasions during which the energy level is to be measured on the first frequency channel;
means for measuring the energy level on the first frequency channel in a first measurement occasion, of the set of measurement occasions, according to the configuration; and
means for operating in association with a second frequency channel of the unlicensed radio frequency band based at least in part on measuring the energy level on the first frequency channel, wherein the second frequency channel is paired with the first frequency channel for the unlicensed radio frequency band.

29. The apparatus of claim 28, wherein the means for operating comprises:
    means for transmitting a report, on at least one uplink channel of the unlicensed radio frequency band, that indicates the energy level measured on the first frequency channel.

30. The apparatus of claim 29, further comprising means for refraining from transmitting on the second frequency channel for a time period that follows transmission of the report based at least in part on a determination at the energy level satisfies a threshold.

* * * * *